United States Patent
Yang et al.

(10) Patent No.: US 8,466,206 B1
(45) Date of Patent: Jun. 18, 2013

(54) PROCESS FOR PREPARING POROUS POLYMER PARTICLES

(75) Inventors: Xiqiang Yang, Webster, NY (US); James R. Bennett, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/334,199

(22) Filed: Dec. 22, 2011

(51) Int. Cl.
*C08J 9/00* (2006.01)

(52) U.S. Cl.
USPC ................. 521/91; 430/108.1; 430/108.2

(58) Field of Classification Search
USPC ................. 521/82, 91; 420/108.2, 108.21
See application file for complete search history.

(56) References Cited

U.S. PATENT DOCUMENTS

| | | | |
|---|---|---|---|
| 4,833,060 A | 5/1989 | Nair et al. | |
| 4,965,131 A | 10/1990 | Nair et al. | |
| 7,754,409 B2 | 7/2010 | Nair et al. | |
| 7,887,984 B2 | 2/2011 | Nair et al. | |
| 2004/0185108 A1* | 9/2004 | Short et al. | 424/489 |
| 2011/0123920 A1 | 5/2011 | Nair et al. | |
| 2011/0262654 A1 | 10/2011 | Yates et al. | |
| 2011/0262858 A1 | 10/2011 | Nair et al. | |

FOREIGN PATENT DOCUMENTS

JP 2010265426 A * 11/2010

OTHER PUBLICATIONS

Zhang,H; Edgar, D.; Murray, P.; Rak-Raszewska, A.; Glennon-Alty, L.; Cooper, A. "Synthesis of Porous Microparticles with Aligned Porosity". Adv. Funct. Mater. 2008, 18, 222-228.*
Zhang et al., "Synthesis of Porous Microparticles with Aligned Porosity," Advanced Functional Materials, 2008, 18, 222-228.
Qian et al., "Controlled freezing and freeze drying: a versatile route for porous and micro-/nano-structured materials," J Chem Technol Biotechnol, 2011; 86: 172-184.

* cited by examiner

*Primary Examiner* — Randy Gulakowski
*Assistant Examiner* — Christina Wales
(74) *Attorney, Agent, or Firm* — Andrew J. Anderson

(57) ABSTRACT

A process for forming polymer particles with aligned pores and controlled narrow particle size distribution, including: a) forming an oil phase by dissolving a polymeric binder in a solvent; b) dispersing the oil phase into a water phase containing a controlled amount of particulate stabilizer and forming an oil-in-water emulsion of controlled narrow dispersed oil phase droplet size distribution; c) freezing the emulsion to freeze solvent in the oil droplets to form frozen solvent domains within the polymeric binder, and also the water in the continuous water phase; and d) removing the frozen solvent from the polymeric binder and the frozen water in the continuous water phase, thereby forming porous polymer particles of controlled narrow particle size distribution and containing directional aligned non-spherical pore structures. Optionally, the porous particles may contain encapsulated functional ingredients.

19 Claims, 3 Drawing Sheets

PROCESS FOR PREPARING POROUS POLYMER PARTICLES

FIELD OF THE INVENTION

The present invention relates to porous polymer particles and more particularly to porous polymer particles with aligned pores. This invention further relates to particles of aligned pores with narrow particle size distribution and a method for preparation thereof.

BACKGROUND OF THE INVENTION

The present invention relates to polymer particles, in particular porous polymeric particles having an aligned pore structure which are useful, e.g., as packing materials for liquid chromatography, particles for porous ink jet receiving layers, electrophotographic toners, adsorbents, cosmetics, paints, building materials, controlled release devices, pharmaceuticals, and the like.

Porous polymer particles are useful for oral, injectable and implantable devices because they have a long circulation time in the body and are efficient drug, enzyme, and protein carriers enabling controlled release of such compositions. The particles form a porous network capable of retaining large amounts of inert and active substances. Such controlled release delivery systems for drugs have a wide variety of advantages over conventional forms of drug administration. Some of these advantages include: decreasing or eliminating the oscillating drug concentrations found with multiple drug administrations; allowing the possibility of localized delivery of the drug to a desired part of the body; preserving the efficacy of fragile drugs; reducing the need for patient follow-up care; increasing patient comfort and improving patient compliance.

Porous polymer particles used for drug delivery, e.g. through an intravascular pathway, must be small in size in order to circulate in the body. A problem with prior art particles is that although small in median size, the quality of the particle size distribution may be inadequate. In particular, there may be a tail of larger particles in the particle size distribution which can give a gritty feel during oral administration, plug needles used for injection, or inhibit circulation in the body. Extensive and tedious filtration may be required in order to remove these larger particles. On the other hand, there may also be significant fractions of fine particles in the particle size distribution which can lead to inadequate loading of drug and also the subsequent release profiles of loaded drugs.

Another problem with prior art particles is that some porous polymer particles may be stabilized by small surfactant molecules or by water-soluble polymers. These prior art stabilizers or emulsifiers are sometimes not desired because they may be toxic or create surface properties on the porous polymer particle which are inappropriate for the application.

Porous polymer particles are also useful for ink jet receivers. While a wide variety of different types of image-recording elements for use with ink jet devices have been proposed heretofore, there are many unsolved problems in the art and many deficiencies in the known products which have limited their commercial usefulness. One such problem is that larger than desired particles create visible defects.

Porous particles containing colorants are useful as electrophotographic toners. U.S. Pat. Nos. 7,887,984 and 7,754,409 describe porous toner particles prepared by a multiple-emulsion—evaporation method. Such a process involves the preparation of a first water-in-oil (W1/O) emulsion, which is then dispersed into a second water phase to form a water-in-oil-in-water (W1/O/W2) emulsion, from which the solvent in the oil phase (O) is removed and porous particles obtained. The porous particles obtained contain discrete pores formed as a result of the W1 phase droplets, and the pores thus have substantially spherical, non-aligned shapes.

Porous polymer particles may also be prepared with spray drying or spray freeze-drying techniques. Spray drying of a polymer solution sometimes leads to the formation of porous particles even when no particular porogens are used. However, spray freezing followed by freeze-drying produces pores in the resulting particles due to temperature induced phase separation. When the solvent used to make the polymer solution can freeze to form shaped crystals, aligned pores may form inside the particles after freeze-drying. For example, in US Patent Application Pub. No. 2011/0262654A1, a spray freezing and freeze-drying process was disclosed for the preparation of porous polymer particles encapsulating metallic flakes. The use of some high melting organic solvents leads to the formation of aligned pores after removal of the frozen solvent. In general, the particle size and particle size distribution are controlled by the spraying step (atomization step), and a relatively wide particle size distribution is expected.

Freeze drying of specific oil-in-water emulsions was shown to produce particles with aligned porosity (*Adv. Funct. Mater.* 2008, 18, 222-228). Polymer solutions in o-xylene (or cyclohexane) were emulsified with water at a controlled rate of shearing in the presence of a surfactant and a water soluble polymer (such as PVA). The emulsion was then freeze-dried and porous particles with aligned pores could be obtained. However, the particle size in this method is believed to be controlled mainly by the shearing during the emulsification step, and the particle size distribution is thus expected to be relatively broad.

There is a need to easily prepare particles with aligned pores and narrow particle size distribution. Uniform particles generally have advantages over polydisperse particles in many applications such as drug encapsulation and delivery. Thus porous particles with aligned pores and with narrow particle size distribution are desired.

SUMMARY OF THE INVENTION

It is an object of the present invention to provide a process for forming a polymer particle with aligned pores.

It is further an object of the present invention to provide a process for forming such porous polymer particles with narrow particle size distribution.

It is still another object of the present invention to provide a process for obtaining porous polymer particles encapsulating functional ingredients.

These and other objects can be achieved according to the present invention, which is directed towards a process for forming polymer particles containing aligned pores, comprising:

a) forming an oil phase by dissolving a polymeric binder in a solvent;

b) dispersing the oil phase into a water phase containing a controlled amount of particulate stabilizer and forming an oil-in-water emulsion of controlled narrow dispersed oil phase droplet size distribution;

c) freezing the emulsion to freeze solvent in the oil droplets to form frozen solvent domains within the polymeric binder, and also the water in the water phase; and d) removing the frozen solvent from the polymeric binder and the frozen water in the continuous water phase thereby forming porous polymer particles of controlled narrow particle size distribution and containing directional aligned non-spherical pore structures.

Figure 1:
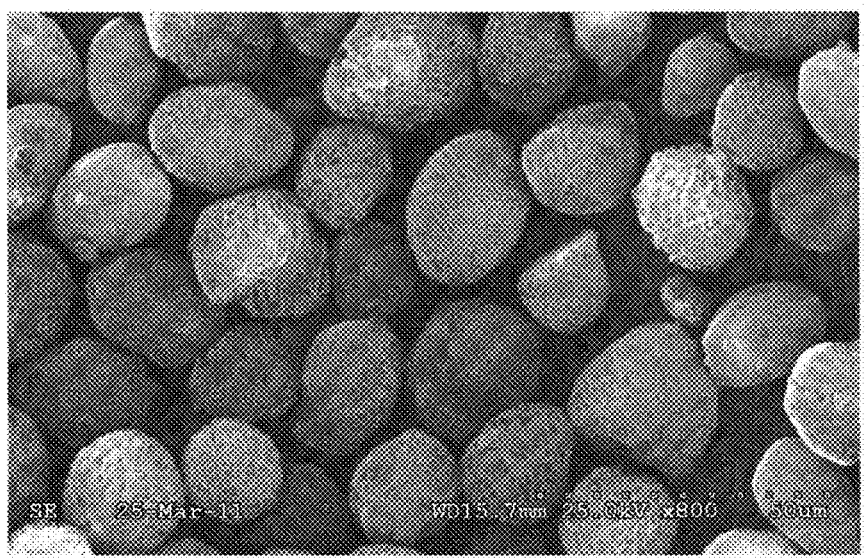
FIG. 1 is an SEM image of porous particles from Example 1.

For a better understanding of the present invention, together with other advantages and capabilities thereof, reference is made to the following detailed description in connection with the above-described drawings.

DETAILED DESCRIPTION OF THE INVENTION

The present invention is directed towards a method for the preparation of porous polymeric particles with aligned pores. A polymer material is dissolved in an organic solvent to form an organic phase. Droplets of the resulting organic phase are formed by forming an oil-in-water emulsion where the water phase contains a particulate stabilizer. The size and size distribution of the droplets are determined by the size and amount of the particulate stabilizer in the water phase. The oil droplets, along with the water phase, are frozen by exposure to a cold environment where the solvent in the droplets is rapidly frozen to form crystalline solvent domains within the polymer. At the same step, the water phase of the emulsion is also frozen, which may happen at any time relative to the freezing of the oil droplets. The resulting cold solid blocks are dried, preferably under reduced pressure, so that the solvent and water are both removed and porous polymer particles are collected. The porous particle is composed of the polymer used and has aligned pores as a result of crystalline domains of frozen solvent formed upon freezing of the oil phase, with an internal porosity of preferably at least 10 volume %.

In accordance with the present invention, the solvents for use in the present invention may be selected from among any of the well-known solvents capable of dissolving polymers and at the same time preferably having relatively high freezing temperature or melting point. The melting point (mp.) of the solvent is preferably in a range of from about −40° C. to about 30° C., and more preferably in a range of from about −40° C. to about 20° C. Typical of the solvents chosen for this purpose are dimethyl carbonate (mp. 2-4° C.), diethyl carbonate (mp. −43° C.), benzene (mp. 5.5° C.), o-xylene (mp. −24° C.), p-xylene (mp. 13.2° C.), and the like. Dimethyl carbonate is preferred.

The present invention is applicable to the preparation of polymeric particles from any type of polymer that is capable of being dissolved in a solvent that is frozen when in the cold environment. Useful particle binder polymers include those derived from vinyl monomers, such as styrene and acrylic monomers, and condensation monomers such as esters and mixtures thereof. As the binder polymer, known binder resins are useable. Concretely, these binder resins include homopolymers and copolymers such as polyesters and polymers derived from styrenes, e.g. styrene and chlorostyrene; monoolefins, e.g. ethylene, propylene, butylene, and isoprene; vinyl esters, e.g. vinyl acetate, vinyl propionate, vinyl benzoate, and vinyl butyrate; a-methylene aliphatic monocarboxylic acid esters, e.g. methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate; vinyl ethers, e.g. vinyl methyl ether, vinyl ethyl ether, and vinyl butyl ether; and vinyl ketones, e.g. vinyl methyl ketone, vinyl hexyl ketone, and vinyl isopropenyl ketone; and mixtures thereof. Particularly desirable binder polymers/resins include polystyrene resin, polyester resin, copolymers derived from styrene and acrylic monomers such as styrene/alkyl acrylate copolymers and styrene/alkyl methacrylate copolymers, styrene/acrylonitrile copolymer, styrene/butadiene copolymer, styrene/maleic anhydride copolymer, polyethylene resin and polypropylene resin. They further include polyurethane resin, epoxy resin, silicone resin, polyamide resin, modified rosin, paraffins, and waxes. Also, especially useful are polyesters of aromatic or aliphatic dicarboxylic acids with one or more aliphatic diols, such as polyesters of isophthalic or terephthalic or fumaric acid with diols such as ethylene glycol, cyclohexane dimethanol and bisphenol adducts of ethylene or propylene oxides. Specific examples are described in U.S. Pat. Nos. 5,120,631; 4,430,408; and 5,714,295, all incorporated herein by reference, and include propoxylated bisphenol-A fumarate, such as FINETONE 382 ES from Reichold Chemicals, formerly ATLAC 382 ES from ICI Americas Inc. Biocompatible or biodegradable polyesters such as polycaprolactone (PCL), Poly (lactic-co-glycolic acid) (PLGA), and poly(lactic acid) (PLA) are particularly useful.

The polymer is preferably used in the organic phase at a concentration of about 5 wt % to 50 wt % in the organic solvent. More preferably it is used at a concentration from about 5 wt % to about 30 wt %, and more preferably from about 10 wt % to about 25 wt %. As the porosity of the formed porous particles due to the aligned pores will be determined by the ratio of solvent to polymer in the oil phase, use of greater than about 50 wt % solvent can advantageously enable particles with greater than about 50 volume % internal porosity due to formation of aligned pores in the formed polymer particles. Use of polymer at less than about 30 wt % enables further increase in porosity of the formed particles, and also reduces viscosity of the oil phase, enabling better uniformity of coalescence of dispersed oil phase droplets, and better monodispersity of resulting polymer particles. Polymer wt % of at least about 5 wt %, and more preferably at least about 10 wt %, enable increased structural strength of the formed porous particles.

In the practice of this invention, it is particularly advantageous to utilize resins having a viscosity in the range of 1 to 100 centipoise when measured as a 20 wt % solution in dimethyl carbonate at 25° C.

Specifically, in the second step of the preferred process employed in the present invention, the oil-in-water emulsion is prepared by dispersing the organic phase into a water phase containing a particulate stabilizer. The resultant mixture from the organic and aqueous phases is then subjected to higher shear mixing or homogenization. In this process, the particulate stabilizer forms an interface between the organic globules in the organic phase. Due to the high surface area associated with small droplets, the coverage by the particulate stabilizer is not complete. Coalescence of the organic droplets continues until the surface is completely covered by particulate stabilizer. Thereafter, no further growth of the dispersed organic phase droplets occurs. Accordingly, the amount of the particulate stabilizer is inversely proportional to the size of the coalesced organic phase droplets, and thus size of the polymer particles obtained. In other words, the size and concentration of the particulate stabilizers control and predetermine the size of the final polymer particles, and, the smaller the size or the higher the concentration of such particulate stabilizer particles, the smaller the size of the final polymer particles. The relationship between the aqueous phase and the organic phase, by volume may typically range from 1:1 to approximately 9:1. This indicates that the organic phase is typically present in an amount from about 10% to 50% of the total homogenized volume. More preferably, the ratio of water phase to oil phase is 1.5 to 5 by weight.

The water phase used in the present invention contains a particulate stabilizer instead of a conventional dissolved surfactant. The particulate stabilizer may comprise inorganic particles (e.g., metal oxide or silica particles), or polymeric particles, such as described in, e.g., U.S. Pat. Nos. 4,833,060 and 4,965,131, the disclosures of which are incorporated by reference herein.

Preferably the particulate stabilizer comprises inorganic particles, and more preferably is colloidal silica such as LUDOX TM, supplied by DuPont Chemical Company, or NALCO 1060, manufactured by Nalco Chemical Company. The amount of the stabilizer used generally ranges from 1 to 15 parts by weight based on 100 parts by weight of the total solids of the oil phase polymer and other additives. With silica as the stabilizer, the pH of the aqueous phase is generally controlled between 4 and 7, and an ionic strength of above 0.1 (mol $kg^{-1}$) is maintained through the use of buffer or electrolyte salt.

In the water phase, a water soluble compound, so called as a promoter, can also optionally be used. The promoter affects the hydrophilic/hydrophobic balance of the solid dispersing agent (i.e., particulate stabilizer) in the aqueous solution, and may be employed in order to drive the solid dispersing agent to the polymer/solvent droplet-water interface. Typical of such promoters are sulfonated polystyrenes, alginates, carboxymethylcellulose, tetramethyl ammonium hydroxide or chloride, diethylaminoethyl methacrylate, water soluble complex resinous amine condensation products of ethylene oxide, urea and formaldehyde and polyethyleneimine. Also, effective for this purpose are gelatin, casein, albumin, gluten and the like or non-ionic materials such as methoxycellulose. The promoter is generally used in an amount from about 0.2 to about 0.6 parts per 100 parts, or percent by weight, of the aqueous solution phase.

For the high shearing homogenization, any type of mixing and shearing equipment may be used for the step to prepare the particulate stabilized oil-in-water emulsion, such as a batch mixer, planetary mixer, single or multiple screw extruder, dynamic or static mixer, colloid mill, high pressure homogenizer, sonicator, or a combination thereof. While any high shear type agitation device is applicable to this step, a preferred homogenizing device is the MICROFLUIDIZER such as Model No. 110T produced by Microfluidics Manufacturing. In this device, the droplets of the oil phase (discontinuous phase) are dispersed and reduced in size in the water phase (continuous phase) in a high flow agitation zone and, upon exiting this zone and completion of limited coalescence in the presence of the particulate stabilizer contained in the continuous aqueous phase, the particle size of the dispersed oil is reduced to uniform sized dispersed droplets in the continuous phase. The amount of particulate stabilizer is controlled in such process such that the formed oil-in-water emulsion is of a controlled narrow dispersed oil phase droplet size distribution. The temperature of the process can be modified to achieve the optimum viscosity for emulsification of the droplets and to control the loss of solvent due to evaporation.

After the emulsion is formed the next step is rapidly freezing the emulsion in a cold environment. The freezing can be achieved by a number of means, such as adding the emulsion dropwise into a reservoir containing liquid nitrogen, placing the emulsion in a vessel, such as a glass or metal vial, and cooling in a liquid nitrogen phase, in a dry ice container, by direct contact with a cold solid surface, or in any cold bath made of a liquid. To promote rapid phase separation between the organic solvent and the polymer and thus obtain pores of narrower size and larger number, it is preferred that a lower temperature bath and smaller volume, large contact area are used in the setup. Therefore liquid nitrogen is preferably used and containers of high thermal conductivity and/or thinner walls are also preferred. Another method of freezing the emulsion may be to combine liquid emulsion phase and liquid nitrogen in a two-jet configuration for rapid freezing of the emulsion.

After freezing of the emulsion, both the organic solvent and water are then removed next. This is most commonly done by freeze drying, where the frozen emulsion is kept at low temperatures and a high vacuum is applied. The volatiles are removed through sublimation. Commercial freeze dryers are available for this purpose and many have programmed temperature control profiles that can be used for better reproducibility. In practice, it is desirable to at first keep the starting temperature relatively low so that solvents with melting points of about −30° C. may still be used. With dimethyl carbonate as solvent, mp. ~2-4° C., the starting temperature may be set higher.

The solid residue after freeze-drying is composed of the porous polymer particles mixed with the aqueous phase addenda, i.e., colloidal silica (the particulate stabilizer), buffer or other electrolyte salts, and optionally promoter molecules. The residue can be rewetted and suspended with water, and sieved and washed to remove the aqueous phase ingredients and obtain pure, porous polymer particles. The formed porous particles obtained in accordance with the present invention advantageously have a controlled relatively narrow particle size distribution, as evidenced, e.g., by a volume based particle size geometric standard deviation (GSD, as defined below) of less than 1.5, more preferably less than or equal to about 1.4, and most preferably less than or equal to about 1.3, for particle size of the particles measured in equivalent circular diameter.

The polymer particles prepared by the method of the present invention may contain various ingredients based on the intended application for these particles.

In one embodiment, metallic flake, or platelet, suitable for the preparation of porous metallic toner particles can be incorporated into the porous polymer particles obtained according to the present invention. Such metallic flakes can be from any of the available commercial sources of metallic flakes in powder or in suspension form. The flakes or platelets are substantially 2-dimensional particles, having opposed main surfaces or faces separated by a relatively minor thickness dimension. The flakes used are preferably primarily in a range of from about 2 to 50 microns in main surface equivalent circular diameter (ECD), where the equivalent circular diameter is the diameter of a circle having the same area as the main face. More preferably, the metallic flakes have a main surface equivalent circular diameter primarily in a range of from about 2 to 20 microns, and even more preferably, in a range of from about 3 to 15 microns. Flake or platelet shaped particles are further characterized in having an aspect ratio (ratio of main face equivalent circular diameter to thickness) of at least 2, and more preferably, of at least about 5. Commercially available metallic flakes typically may have aspect ratios of from 5 to 40, or even higher.

Examples of usable metallic flakes include those from Ciba Specialty Chemicals, a Division of BASF, such as aluminum flakes METASHEEN 91-0410, in ethyl acetate, and those from NanoDynamics such as copper flakes Grade CI-4000F, 4 μm, solid powder. Other metal flakes include but are not limited to tin, gold, silver, platinum, rubidium, brass, bronze, stainless steel, zinc, and mixtures thereof. In addition to pure metal flakes, metal or metal oxide coated materials such as metallic oxide-coated mica, metallic oxide-coated glass, and mixtures thereof can be used as metallic flakes. A gold tone can be achieved with genuine gold; however, copper and zinc, preferably in the form of an alloy, which depending on the composition can thus be referred to as brass or bronze, may alternatively be used. Preferably, the ratio of copper and zinc fractions in the alloy varies from about 90:10 to about 70:30. As the zinc fraction in the alloy increases, the metallically golden hue changes from a more reddish to a more yellowish or even greenish gold tone. The color of the gold tone may be intensified through a controlled oxidation of the metal. A silver tone can result from the metallic flakes containing among other possibilities, aluminum.

The metallic flakes may be used in an organic mixture in which the concentration of the metallic flakes ranges from about 3% to 30%, by weight, based upon the total weight of solids. More preferably, the metallic flakes are used in the amount of 4% to 25%, by weight, based on the total weight of solids.

Depending upon desired end use of the particles containing encapsulated metallic flakes prepared by one embodiment of the process of the invention, various additives may be incorporated in the solvent. For particles intended to be used as electrophotographic toners, e.g., additives such as charge control agents, waxes and lubricants may be employed. Suitable charge control agents are disclosed, for example, in U.S. Pat. Nos. 3,893,935; 4,079,014; 4,323,634; 4,394,430 and British Patents 1,501,065; and 1,420,839. Additional charge control agents which are useful are described in U.S. Pat. Nos. 4,624,907; 4,814,250; 4,840,864; 4,834,920; 4,683,188 and 4,780,553. Mixtures of charge control agents can also be used. Charge control agents are generally employed in small quantities such as from about 0.1% to 10% by weight based upon the weight of the total solids and preferably from about 0.2% to about 5.0%.

Waxes useful for incorporation into porous particles in accordance with one embodiment of the present invention include low-molecular weight polyolefins such as polyethylene, polypropylene and polybutene; silicone resins which can be softened by heating; fatty acid amides such as oleamide, erucamide, ricinoleamide, and stearamide; vegetable waxes such as carnauba wax, rice wax, candelilla wax, Japan wax, and jojoba oil; animal waxes such as bees wax; mineral and petroleum waxes such as montan wax, ozocerite, ceresine, paraffin wax, microcrystalline wax, and Fischer-Tropsch wax; and modified products thereof. Irrespective to the origin, waxes having a melting point in a range of from 30 to 150° C. are preferred and those having a melting point in a range of from 40 to 140° C. are more preferred. The wax may be used in the amount of, for example, 1 to 20% by weight, and preferably 2 to 15% by weight, based on the particle.

Wax may be incorporated into the polymer particle through several ways. The wax may be first dispersed in an appropriate polymer binder by melt compounding and then mixed with the solvent to form the organic phase. It may also be separately processed into a fine dispersion in an organic solvent, with appropriate dispersing aids. In all cases, when employed, the wax preferably exists in the final particle as fine solid particles.

In further embodiments, compatibilizing materials for metallic flakes may be added in the oil phase. Such materials can be, e.g., fatty acids, amides, anhydrides, epoxides, or amines. Such materials can be mixed into the organic solvent together with the metallic flakes, or added to the suspension of flakes after it is prepared to help prevent the flocculation or sedimentation of the metallic flakes.

Conventional pigments and dyes may be employed in the present invention in place of or in combination with such metallic flakes. Pigments suitable for use in the practice of the present invention should be capable of being dispersed in the polymer solution, and preferably yield strong permanent color. Typical of such pigments are the organic pigments such as phthalocyanines, lithols and the like, and inorganic pigments such as $TiO_2$, carbon black, and the like. Typical of the phthalocyanine pigments are copper phthalocyanine, a monochlor copper phthalocyanine, and hexadecachlor copper phthalocyanine. Other organic pigments suitable for use herein include anthraquinone vat pigments such as vat yellow 6GLCL1127, quinone yellow 18-1, indanthrone CL1106, pyranthrone CL1096, brominated pyranthrones such as dibromopyranthrone, vat brilliant orange RK, anthramide brown CL 1151, dibenzanthrone green CL1101, flavanthrone yellow CL1118, azo pigments such as toluidine red C169 and hansa yellow; and metalized pigments such as azo yellow and permanent red. The carbon black may be any of the known types such as channel black, furnace black, acetylene black, thermal black, lamp black and aniline black. The pigments may be employed in an amount sufficient to give a content thereof in the particle from about 1% to 40%, by weight, based upon the weight of the particle, and preferably within a range of from 4% to 20%, by weight.

Other potential applications of porous microparticles obtained in accordance with the invention include, e.g., oral drug delivery and pulmonary drug delivery. The porous particles prepared according to the present invention, e.g., possess high porosity and thus have much increased surface areas in the sample. An increased porosity and powder surface area are likely to result in an increased dissolution rate and potentially improved bioavailability for oral drug delivery. Further, the stability of suspensions for oral administration may be improved by the use of porous microparticles, which will settle slowly in suspension due to their small particle size and low bulk density. This in turn will ensure improved and accurate dosing.

Porous particles are known to be beneficial for drug delivery to the respiratory tract by oral inhalation. Porous microparticles have reduced interparticulate attractive forces and improved flow characteristics relative to micronized drug materials. They have low bulk densities and exhibit smaller aerodynamic diameters than represented by their geometric diameters, facilitating greater deposition in the lower pulmonary region, as is required for systemic drug delivery—of particular importance for the delivery of proteins, such as insulin. They have potential for improved efficiency of administration to the lungs in the dry form (dry powder inhaler formulations) and also a potential for improved suspension stability in liquid inhaler formulations (metered dose inhalers), with a reduced tendency to sediment in the liquefied propellant.

There is an increasing interest in recent years in the pulmonary route as an alternative to the parenteral route for the delivery of protein-based biopharmaceuticals. Recently, a spray dried form of insulin (with excipients in a buffered sugar-based matrix) has been marketed for delivery of the bioactive by the pulmonary route (White et al., Exubera®: Pharmaceutical Development of a Novel Product for Pulmonary Delivery, Diabetes Technology and Therapeutics, 7(6) 896-906 (2005)). Porous particles prepared in accordance with the present invention offer the potential for porous protein, peptide or polypeptide particles suitable for inhalation which contain no excipient materials. Porous microparticles technology of the present invention may be applied to such protein, peptide or polypeptide actives to increase the efficacy of the formulation.

As mentioned, the particle size obtained depends on the size of the organic phase droplet in the emulsion. Typically particles are preferably formed in a range of from 2 to 100 microns in diameter, and more preferably, particles in a size range from 4 to 50 microns are desired.

The process of the present invention will now be more particularly described with reference to some examples which might reveal further inventive features, but to which the present invention is not restricted in its scope.

Materials.

Kao Binder N polyester resin used in the examples below was obtained from Kao Specialties Americas LLC, a part of Kao Corporation, Japan. Poly(styrene butylacrylate) binder PICCOTONER 1221 was from Hercules-Sanyo as an 80% styrene-20% butylacrylate copolymer. JONCRYL 611, a poly(styrene acrylic acid) resin, was obtained from BASF Corporation. NALCO 1060, a colloidal silica, was obtained from Nalco Company as a 50 weight percent dispersion. Other chemicals (dimethyl carbonate, citric acid, potassium hydrogen phosphate) were purchased from Sigma-Aldrich and used as received. Aluminum flakes were purchased from Ciba Specialty Chemicals (METASHEEN 91-0410) as a slurry in ethyl acetate.

Particle Size Analysis.

Unless indicated otherwise, the particle diameter was measured on a HORIBA LA-930 analyzer. Particle size is measured in equivalent circular diameter in micro meters (microns) based on volume, and the mean and median are given. The particle size distribution or the spread of the particle size is measured with the geometric standard deviation (GSD), which is defined as $GSD=(D_{84}/D_{16})^{1/2}$ where $D_{84}$ and $D_{16}$ represent the diameters at which 84% and 16% of the particle volume are contained, respectively, in diameters less than these diameters.

Particle Shape Analysis.

The size and shape of the particles were measured using a SYSMEX FPIA-3000 automated particle shape and size analyzer from Malvern Instruments. Samples as suspensions in aqueous media pass through a sheath flow cell that transforms the particle suspension into a narrow or flat flow, ensuring that the largest area of the particle is oriented towards the camera and that all particles are in focus. The CCD camera captures 60 images every second and these are analyzed in real time. Numerical evaluation of particle shape is derived from measurement of the area of the particle. A number of shape factors can be calculated including circularity, aspect ratio and convexity using image analysis in two dimensions. Although it is realized that these calculated shape parameters are only two-dimensional representation of the particles, they generally correlate with the visual irregularity of the particles. Thus the aspect ratio (W/L), which is the ratio of width to length of the particle, and circularity, which is defined as the circumference of circle of equivalent area divided by the actual perimeter of the particle, are reported to represent the irregularity of the particles. A circularity closer to 1 (i.e., unity) means more spherical particles, and the more elongated or rough-edged the particle is, the lower the circularity. Aspect ratios of less than 0.92, especially less than 9.0, and circularities of less than 0.99, especially less than 0.98, are representative of shaped, non-spherical particles.

The SYSMEX FPIA-3000 analyzer also measures particle size and particle size distribution. When such data are available, mainly for particles smaller than about 10 microns, the volume based mean, median, and geometric standard deviation may be used.

Porosity Measurement.

The extent of porosity of the particles of the present invention can be visualized using a range of microscopy techniques. Conventional Scanning Electron Microscope (SEM) imaging was used to image fractured samples and view the inner pore structure. The SEM images give an indication of the porosity of the particles, but are not normally used for quantification.

A commonly used method of measuring porosity is mercury intrusion porosimetry. It is known that this technique typically can estimate the porosity due to internal pores accurately but may not be able to detect surface or open pores. The particles obtained by the present method may have visible surface pores that are difficult to quantify, so mercury intrusion porosimetry gives a measurement of the porosity due mainly to the internal anisotropic pores and thus a lower limit of the fraction of voids contained in these particles.

Example 1

PICCOTONER 1221 Polymer Binder with JONCRYL 611 Additive

An organic phase was prepared by dissolving 7.60 g of PICCOTONER 1221 poly(styrene butylacrylate) and 0.40 g of JONCRYL 611 poly(styrene acrylic acid) in 32.0 g of dimethyl carbonate. The organic phase was dispersed in 100 g of an aqueous phase comprising 0.88 g of NALCO 1060 colloidal silica and 99.12 g of a pH 4.0 Phosphate-Citrate buffer with the aid of a SILVERSON L4R Mixer at very high shear. The mixture was homogenized with a Microfluidizer and the resulting oil-in-water emulsion was placed in a glass jar which was subsequently placed in a liquid nitrogen bath. The frozen emulsion was then placed in a VirTis FREEZEMOBILE 25ES freeze-drier (with a UNITOP 600L unit with temperature control). The sample was freeze dried at −40° C. for 2 h followed by temperature ramps over 2 h to −30, −15, 0, and 10° C., respectively. After further drying at 10° C. for over 4 h, the sample was dispersed in and washed with water. Analysis of particle size using a HORIBA LA-930 analyzer gives a volume based mean particle size of 22.3 microns and a median of 21.7 microns with a GSD of 1.272 (standard deviation of 5.78 microns). A selected scanning electron microscopy (SEM) image (×800) of the recovered particles is given in FIG. 1, which clearly shows the relatively narrow particle size distribution of the samples. It is also evident that the majority of the particles have a non-spherical shape.

Example 2

Porous Particles of Smaller Sizes

Figure 2:
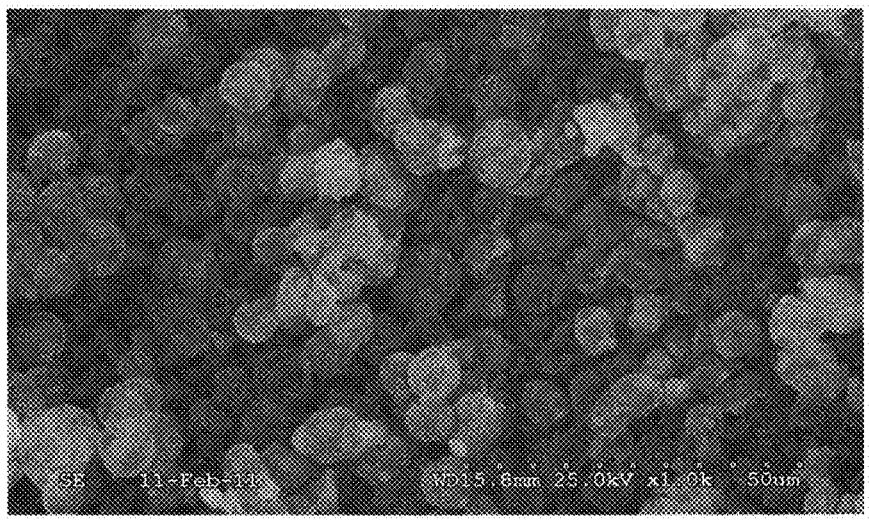
FIG. 2 is an SEM image of porous particles from Example 2.

An organic phase was prepared by dissolving 7.60 g of PICCOTONER 1221 poly(styrene butylacrylate) and 0.40 g of JONCRYL 611 poly(styrene acrylic acid) in 32.0 g of dimethyl carbonate. The organic phase was dispersed in 100 g of an aqueous phase comprising 3.7 g of NALCO 1060 colloidal silica and 99.12 g of a pH 4.0 Phosphate-Citrate buffer with the aid of a SILVERSON L4R Mixer at very high shear. The mixture was homogenized with a Microfluidizer and the resulting oil-in-water emulsion was placed in a glass jar which was subsequently placed in a liquid nitrogen bath. The frozen emulsion was then placed in a VirTis FREEZEMOBILE 25ES freeze-drier (with a UNITOP 600L unit with temperature control). The sample was freeze dried at −40° C. for 2 h followed by temperature ramps over 2 h to −30, −15, 0, and 10° C., respectively. After further drying at 10° C. for over 4 h, the sample was dispersed in and washed with water. Analysis of particle size using SYSMEX FPIA-3000 automated particle shape and size analyzer gives a volume based mean particle size of 8.91 microns and a median of 8.01 microns, with a calculated geometric standard deviation of 1.29. A typical scanning electron microscopy (SEM) image (×1000) of the recovered particles is shown in FIG. 2, which clearly shows the relatively narrow particle size distribution of the samples. It can also be said that a significant fraction of the particles have a non-spherical shape. Sysmex analysis gave a calculated mean aspect ratio (W/L) of 0.89 (median 0.91), which indicates a significant deviation from sphericity.

Examples 3a-3e (Comparative)

Porous Particles by Freeze Drying of Emulsions Stabilized with Surfactants

Figure 3A:
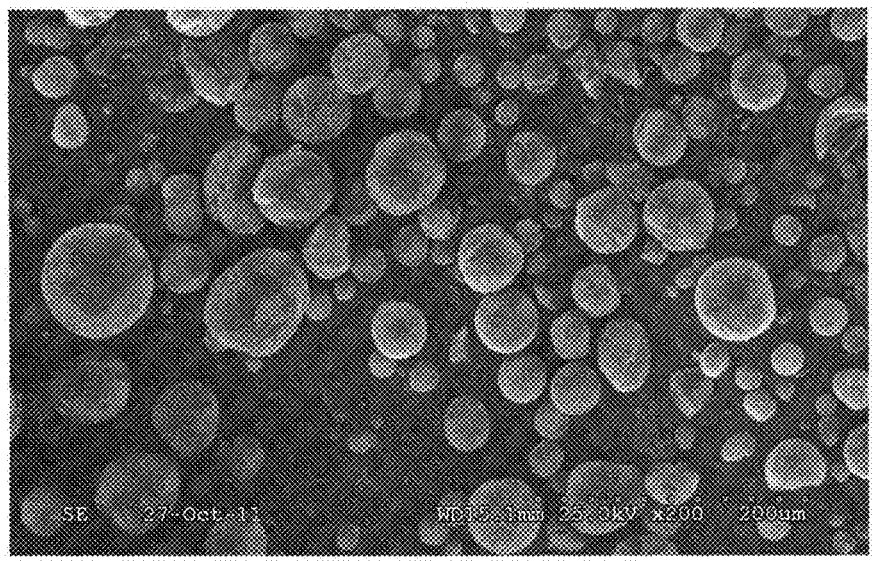
FIGS. 3A and 3B are SEM images of porous particles from comparative Example 3c.
Figure 3B:
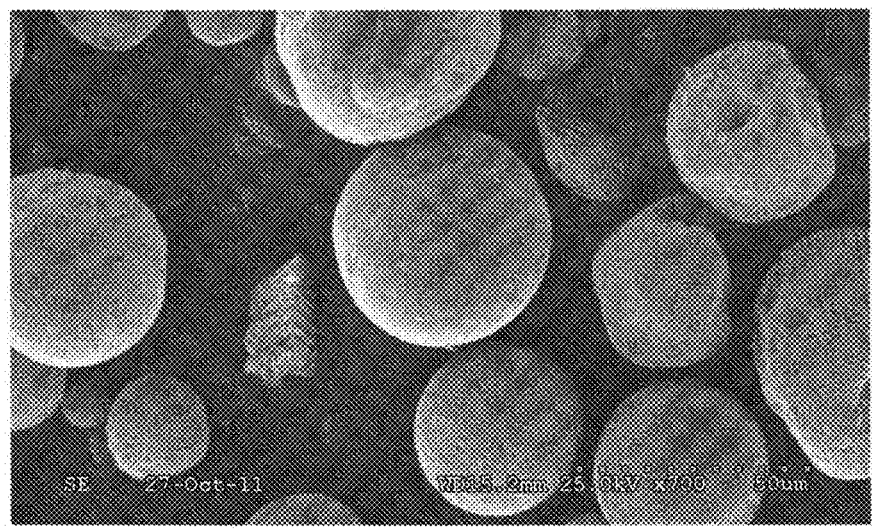

An organic phase was prepared by dissolving 7.60 g of PICCOTONER 1221 poly(styrene butylacrylate) and 0.40 g of JONCRYL 611 poly(styrene acrylic acid) in 32.0 g of dimethyl carbonate. The organic phase was dispersed in 100 g of an aqueous phase comprising a surfactant (details in Table 1) and a pH 4.0 Phosphate-Citrate buffer with the aid of a SILVERSON L4R Mixer at a controlled shear rate (SILVERSON mixer equipped with intermediate disintegration head and mixing at about 2000 rpm for 1 min.). The mixture was then placed in a glass jar which was subsequently placed in a liquid nitrogen bath. The frozen emulsion was then placed in a VirTis FREEZEMOBILE 25ES freeze-drier (with a UNITOP 600L unit with temperature control). The sample was freeze dried at −40° C. for 2 h followed by temperature ramps over 2 h to −30, −15, 0, and 10° C., respectively. After further drying at 10° C. for over 4 h, the sample was dispersed in and washed with water. Samples were analyzed using a HORIBA instrument and the results are shown in the table below (Table 1). A visual indication of the wide size distribution is shown in FIGS. 3A and 3B, which are SEM images (×200 and ×700, respectively) of the sample from comparative Example 3c.

TABLE 1

Comparative examples

| Example | Surfactant | % Surfactant[1] | Mean Particle Size, μm | Median Particle Size, μm | GSD |
|---|---|---|---|---|---|
| 3a | PVA | 0.5 | 59.44 | 55.45 | 1.611 |
| 3b | PVA | 1.0 | 53.88 | 51.25 | 2.152 |
| 3c | SA85 | 0.5 | 54.31 | 49.18 | 1.861 |
| 3d | SA85 | 1.0 | 36.49 | 32.62 | 1.878 |
| 3e | SDS | 0.5 | 21.22 | 18.38 | 1.841 |

[1]Relative to oil phase by weight.

PVA is poly(vinyl alcohol).
SDS is sodium dodecyl sulfate.

Surfactant SA85:

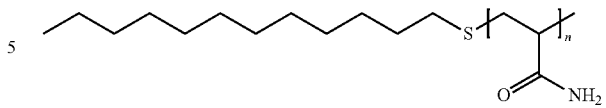

It is clear from the table above that much wider particle size distribution than that in Example 1 was obtained when traditional surfactants were used.

Example 4

Porous Particles with PICCOTONER 1221, Porosity Measurement

Figure 4:
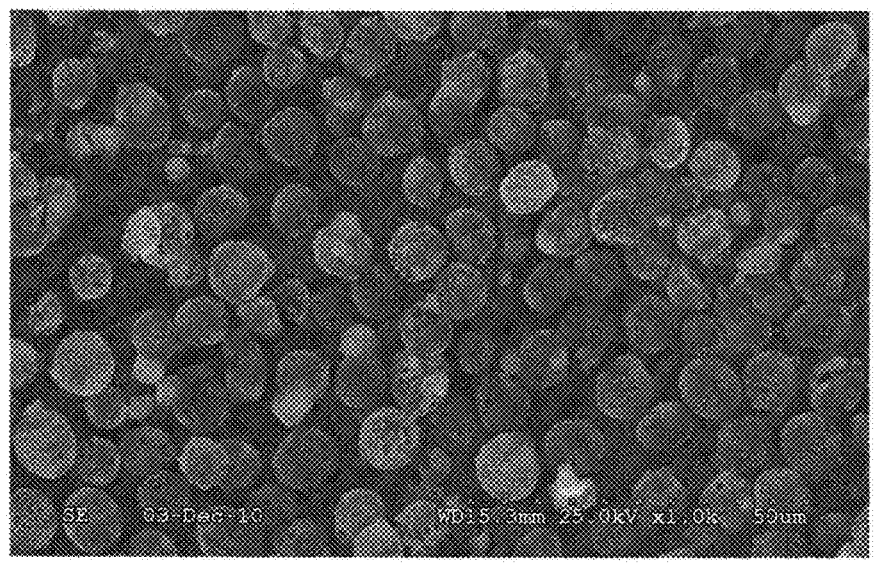
FIG. 4 is an SEM image of porous particles from Example 4.

An organic phase was prepared by dissolving 8.00 g of PICCOTONER 1221 poly(styrene butylacrylate) in 32.0 g of dimethyl carbonate. The organic phase was dispersed in 100 g of an aqueous phase comprising 3.70 g of NALCO 1060 colloidal silica and 76.30 g of a pH 4.0 Phosphate-Citrate buffer with the aid of a Silverson L4R Mixer at high shear rate. The mixture was further homogenized with a Microfluidizer, and the emulsion then placed in a glass jar which was subsequently placed in a liquid nitrogen bath. The frozen emulsion was placed in a VirTis FREEZEMOBILE 25ES freeze-drier (with a UNITOP 600L unit with temperature control). The sample was freeze-dried at −40° C. for 2 h followed by temperature ramps over 2 h to −30, −15, 0, and 10° C., respectively. After further drying at 10° C. for over 4 h, the sample was dispersed in and washed with water. A dried sample was analyzed for porosity using mercury intrusion porosimetry and a value of 59.2% was obtained. Also an SEM image (×1000) of the sample, FIG. 4, shows the narrow particle size distribution and the noticeable shape of the resulted particles.

Example 5

Porous Particles Encapsulating Aluminum Flakes

Figure 5:
FIG. 5 is an optical reflective microscopic image of fused porous particles from Example 5.

An organic phase was prepared by dispersing 0.75 g of aluminum flakes into a solution containing 23.63 g of dimethyl carbonate, 4.725 g of PICCOTONER 1221 poly(styrene butylacrylate), 0.30 g of JONCRYL 611 poly(styrene acrylic acid) and 0.60 g of Kao N polyester resin. The organic phase was dispersed in 75.0 g of an aqueous phase comprising 0.66 g of NALCO 1060 colloidal silica and 74.34 g of a pH 4.0 Phosphate-Citrate buffer with the aid of a SILVERSON L4R Mixer at high shear rate. The mixture was further homogenized with a Microfluidizer, and the emulsion then placed in a glass jar which was subsequently placed in a liquid nitrogen bath. The frozen emulsion was placed in a VirTis FREEZEMOBILE 25ES freeze-drier (with a UNITOP 600L unit with temperature control). The sample was freeze-dried at −40° C. for 2 h followed by temperature ramps over 2 h to −30, −15, 0, and 10° C., respectively. After further drying at 10° C. for over 4 h, the sample was washed with water and then collected and dried. Particles were spread on a sheet of white copier paper and placed in a hot oven at 100° C. for 15 min. The encapsulation of the aluminum flakes is observed in an optical reflective microscopic image of the fused porous particles, as shown in FIG. 5.

The invention has been described in detail with particular reference to certain preferred embodiments thereof, but it will be understood that variations and modifications can be effected within the spirit and scope of the invention.

The invention claimed is:

1. A process for forming polymer particles with aligned pores and controlled narrow particle size distribution, comprising:
   a) forming an oil phase by dissolving a polymeric binder in a solvent;
   b) dispersing the oil phase into a water phase containing a controlled amount of particulate stabilizer and forming an oil-in-water emulsion of controlled narrow dispersed oil phase droplet size distribution;
   c) freezing the emulsion to freeze solvent in the oil droplets to form frozen solvent domains within the polymeric binder, and also the water in the continuous water phase; and
   d) removing the frozen solvent from the polymeric binder and the frozen water in the continuous water phase, thereby forming porous polymer particles of controlled narrow particle size distribution and containing directional aligned non-spherical pore structures, wherein the formed porous particles have a volume based particle size geometric standard deviation of less than 1.5 for particle size of the particles measured in equivalent circular diameter.

2. The process according to claim 1, wherein the formed porous particles have a volume based particle size geometric standard deviation of less than 1.4 for particle size of the particles measured in equivalent circular diameter.

3. The process according to claim 1, wherein the formed porous particles have a volume based particle size geometric standard deviation of less than 1.3 for particle size of the particles measured in equivalent circular diameter.

4. The process according to claim 1, wherein the frozen solvent and water are removed from the frozen emulsion under conditions of reduced pressure.

5. The process according to claim 1, wherein the polymeric binder comprises a copolymer resin derived from styrene and acrylic monomers, or a polyester resin.

6. The process according to claim 1, wherein the polymeric binder has a concentration of about 5% to about 50% by weight in the oil phase.

7. The process according to claim 1, wherein the solvent is dimethyl carbonate.

8. The process according to claim 1, wherein the porous particles formed have a volume based mean particle size of 2 to 100 micrometers for particle size of the particles measured in equivalent circular diameter.

9. The process according to claim 8, wherein the porous particles formed have a non-spherical shape characterized by a mean aspect ratio of 0.9 or less.

10. The process according to claim 1, wherein the emulsion is frozen in liquid nitrogen.

11. The process according to claim 1, wherein the removal of the solvent and water is achieved under vacuum with a controlled temperature ramp from −40° C. to 10° C.

12. The process according to claim 1, further comprising including metallic flakes in the oil phase, and wherein the metallic flakes are encapsulated in the formed porous polymer particles.

13. The process according to claim 12, wherein the metallic flakes are substantially 2-dimensional particles, having opposed main surfaces separated by a relatively minor thickness dimension, and have a main surface equivalent circular diameter primarily in the range of from about 2 microns to about 20 microns, and an aspect ratio of at least 2.

14. The process according to claim 12, wherein the metallic flakes are present at a concentration of from about 3% to about 30% by weight relative to that of the total weight of solids.

15. The process according to claim 1, wherein the ratio of water phase to oil phase is 1.5 to 5 by weight.

16. The process according to claim 1, wherein the particulate stabilizer is an inorganic particulate stabilizer.

17. The process according to claim 16, wherein the particulate stabilizer is colloidal silica.

18. The process according to claim 1, wherein the porous particles formed have a porosity of at least 10 volume %.

19. The process according to claim 1, wherein the porous particles formed have a porosity of greater than 50 volume %.

* * * * *